(12) United States Patent
Hartman (10) Patent No.: US 12,403,583 B2
(45) Date of Patent: Sep. 2, 2025

(54) TOOL TRAYS FOR MOUNTING TO SAW FRAMES

(71) Applicant: Micah Hartman, Hillsboro, OR (US)

(72) Inventor: Micah Hartman, Hillsboro, OR (US)

( * ) Notice: Subject to any disclaimer, the term of this patent is extended or adjusted under 35 U.S.C. 154(b) by 0 days.

(21) Appl. No.: 18/219,034

(22) Filed: Jul. 6, 2023

(65) Prior Publication Data

US 2025/0010457 A1 Jan. 9, 2025

(51) Int. Cl.
*B25H 3/06* (2006.01)
*B23D 59/00* (2006.01)

(52) U.S. Cl.
CPC .............. *B25H 3/06* (2013.01); *B23D 59/00* (2013.01)

(58) Field of Classification Search
CPC .................... B23D 59/00; B25H 3/06
See application file for complete search history.

(56) References Cited

U.S. PATENT DOCUMENTS

| | | | | |
|---|---|---|---|---|
| 1,614,342 A * | 1/1927 | Bleckley | ............... | A47G 21/14 |
| | | | | 211/89.01 |
| 5,101,988 A * | 4/1992 | Meyer | ...................... | A47F 5/08 |
| | | | | 211/184 |
| 6,095,057 A * | 8/2000 | Corban | ................ | A47B 96/027 |
| | | | | 108/42 |
| 6,361,003 B1 * | 3/2002 | Keoun | ................. | B66F 11/044 |
| | | | | 248/312.1 |
| 6,837,383 B1 * | 1/2005 | McElhaney, Jr. | ........ | B25H 5/00 |
| | | | | 211/70.6 |
| 7,275,641 B1 * | 10/2007 | Purnell | .................... | B25H 3/02 |
| | | | | 220/826 |
| 8,701,952 B1 * | 4/2014 | Tripp | ..................... | B60R 11/06 |
| | | | | 224/543 |
| 9,056,756 B1 * | 6/2015 | De Marco | ................ | A47F 5/08 |
| 10,710,234 B1 * | 7/2020 | Summers | .............. | B25H 3/022 |
| 10,745,969 B1 * | 8/2020 | Robertson | ................ | E06C 7/14 |
| 2004/0234356 A1 * | 11/2004 | Parker | .................. | F16B 37/068 |
| | | | | 411/181 |
| 2005/0056486 A1 * | 3/2005 | Butler | ...................... | E06C 7/14 |
| | | | | 182/129 |
| 2006/0102569 A1 * | 5/2006 | Laga | ..................... | A47F 5/0807 |
| | | | | 211/70.6 |

(Continued)

OTHER PUBLICATIONS

Asa Christiana, Hanging tool panels are handy and mobile, Jan. 2, 2018, Build Stuff, https://buildstuffsite.wordpress.com/2018/01/02/hanging-tool-panels-are-handy-and-mobile/ (Year: 2018).*

*Primary Examiner* — Ernesto A Grano
*Assistant Examiner* — Symren K Sanghera
(74) *Attorney, Agent, or Firm* — Mohr Intellectual Property Law Solutions, PC (57) ABSTRACT

Trays for mounting to saw frames and supporting tools. The trays include a trough, a back member, and a hanger. The trough includes a floor and extends longitudinally from a first end to a second end opposite the first end. The back member extends transversely from the floor and defines a back side of the trough. The hanger projects from the back member away from the trough. The hanger is complementarily configured with a frame for a saw with the hanger configured to secure to a rail of the frame. In some examples, the tray includes a sleeve. In some examples, the tray includes a self-clinching fastener.

13 Claims, 10 Drawing Sheets

(56) References Cited

U.S. PATENT DOCUMENTS

| | | | | |
|---|---|---|---|---|
| 2008/0251476 | A1* | 10/2008 | Shiao | B25H 3/04 |
| | | | | 211/70.6 |
| 2012/0298539 | A1* | 11/2012 | Purnell, Jr. | B25H 3/02 |
| | | | | 206/372 |
| 2021/0039246 | A1* | 2/2021 | Grela | B25H 3/04 |
| 2024/0253390 | A1* | 8/2024 | Torres | B44D 3/123 |

* cited by examiner

TOOL TRAYS FOR MOUNTING TO SAW FRAMES

BACKGROUND

The present disclosure relates generally to trays. In particular, tool trays for mounting to saw frames are described.

Working with power saws often necessitates using additional tools to make accurate cuts. For example, one may use a carpenter's square, a speed square, a tape measure, a ruler, a pencil, or tape to determine and/or mark where cuts should be made on a workpiece. It is helpful and convenient to have additional tools needed for a job on hand near the power saw.

An existing approach to having tools on hand when using a power saw is to wear a tool belt. However, a tool belt is not capable of holding all tools that one may need with a power saw, such as larger or heavier tools. Further, not everyone owns a tool belt and some find tool belts uncomfortable or tiring to wear.

Tool trays are a good alternative to tool belts, but known trays are not entirely satisfactory. For example, existing trays are not designed to mount to a frame of a saw. As a result, conventional trays are not convenient to have near a saw and/or are prone to being knocked over.

It would be desirable to have a tray that was configured to mount to a saw frame. Further, it would be convenient to have a tray that easily hung from a saw frame. Moreover, it would be advantageous to have a tray that selectively fastened to a saw frame. It would be useful for a tray to have features specially designed to support additional tools in a secure and organized manner.

Thus, there exists a need for trays that improve upon and advance the design of known trays. Examples of new and useful trays relevant to the needs existing in the field are discussed below.

SUMMARY

The present disclosure is directed to trays for supporting tools. The trays include a trough, a back member, and a hanger. The trough includes a floor and extends longitudinally from a first end to a second end opposite the first end. The back member extends transversely from the floor and defines a back side of the trough. The hanger projects from the back member away from the trough. The hanger is complementarily configured with a frame for a saw with the hanger configured to secure to a rail of the frame. In some examples, the tray includes a sleeve. In some examples, the tray includes a self-clinching fastener.

In some examples, the back member extends from the first end to the second end, the hanger extends from the first end to the second end, and a hanger gap is defined between the first end and the second end.

This document describes certain examples where the hanger gap is complementarily configured with a support member of the frame to receive the support member within the hanger gap, and the hanger gap is aligned with the support member when the hanger secures to the rail.

In select embodiments, the hanger includes a first hanger member and a second hanger member. The first hanger member may extend transverse to the back member to a projection end distal the back member. The second hanger member may extend transverse to the first hanger member from the projection end.

As described below, in particular instances the second hanger member extends parallel to the back member.

In some examples, the floor defines a floor level, the back member extends from the floor to a top end opposite the floor and defines a top level, and the first hanger member extends from the top end.

This document describes certain examples where the second hanger member extends from the first hanger member towards the floor level and away from the top level.

In select embodiments, the back member and the hanger define a J-shape when viewed from a longitudinal end.

As described below, in particular instances the trough includes a divider member extending laterally across the trough to define a first trough portion on a first longitudinal side of the divider member and a second trough portion on a second longitudinal side of the divider member opposite the first longitudinal side.

In some examples, the divider member extends laterally across the trough at a position off-center of the length of the trough to make the length of the first trough portion different than the length of the second trough portion.

In some examples, the tray includes a sleeve secured to the back member on a trough-facing side of the back member.

This document describes certain examples where the sleeve includes a port having a first opening distal the floor and a second opening proximate the floor.

In select embodiments, the floor defines a first slot aligned with a portion of the port.

As described below, in particular instances the sleeve and the first slot are complementarily configured with a first tool to receive and secure the first tool.

In some examples, the first tool is a speed square, the port is configured for the speed square to pass through the port except for a T-edge portion of the speed square, the port is configured to support the T-edge portion of the speed square, and the first slot is configured to receive a tip of the speed square distal the T-edge to allow the speed square to extend past the floor.

This document describes certain examples where the floor defines a second slot complementarily configured with a second tool.

In select embodiments, the second slot is proximate a longitudinal end of the trough.

As described below, in particular instances the second tool is a carpenter square, the second slot is configured to receive a first arm of the carpenter square, and the longitudinal end of the trough is configured to support a second arm of the carpenter square extending perpendicular to the first arm.

In some examples, the back member defines a fastener port through the back member complementarily configured with a fastener configured to secure the tray to the frame.

In certain examples, the tray includes a self-clinching fastener disposed within the fastener port.

DETAILED DESCRIPTION

The disclosed trays will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various trays are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including." and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Tool Trays for Mounting to Saw Frames

With reference to the figures, tool trays for mounting to saw frames will now be described. The trays discussed herein function to mount to saw frames and to support tools one may utilize when using a saw.

The reader will appreciate from the figures and description below that the presently disclosed trays address many of the shortcomings of conventional trays. For example, the novel trays discussed below are configured to mount to a saw frame to conveniently locate the tray and the tools it supports close to the power saw.

Further, the novel trays readily hang from a saw frame to make mounting the tray to the saw frame easy. Moreover, the novel trays below selectively fasten to a saw frame to make them secure and stable unlike conventional trays that are prone to being knocked over. Helpfully, the novel trays discussed below have features specially designed to support additional tools in a secure and organized manner.

Contextual Details

Ancillary features relevant to the trays described herein, including tray 100 depicted in FIGS. 1-9, will first be described to provide context and to aid the discussion of the trays.

Saw

Figure 2:
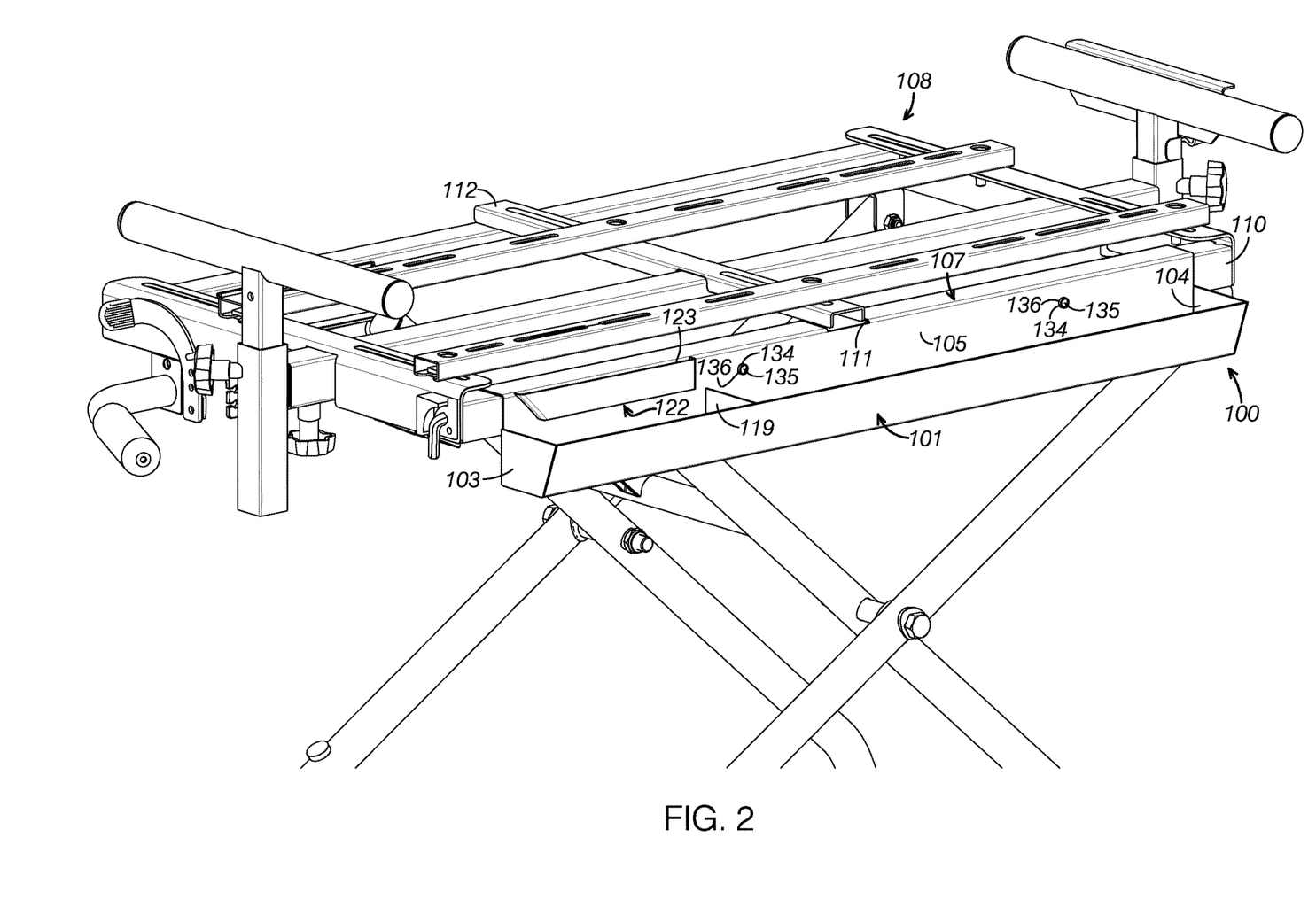
FIG. 2 is a perspective view of the tray shown in FIG. 1 hanging from a rail of a saw frame without tools supported in the tray.
Figure 3:
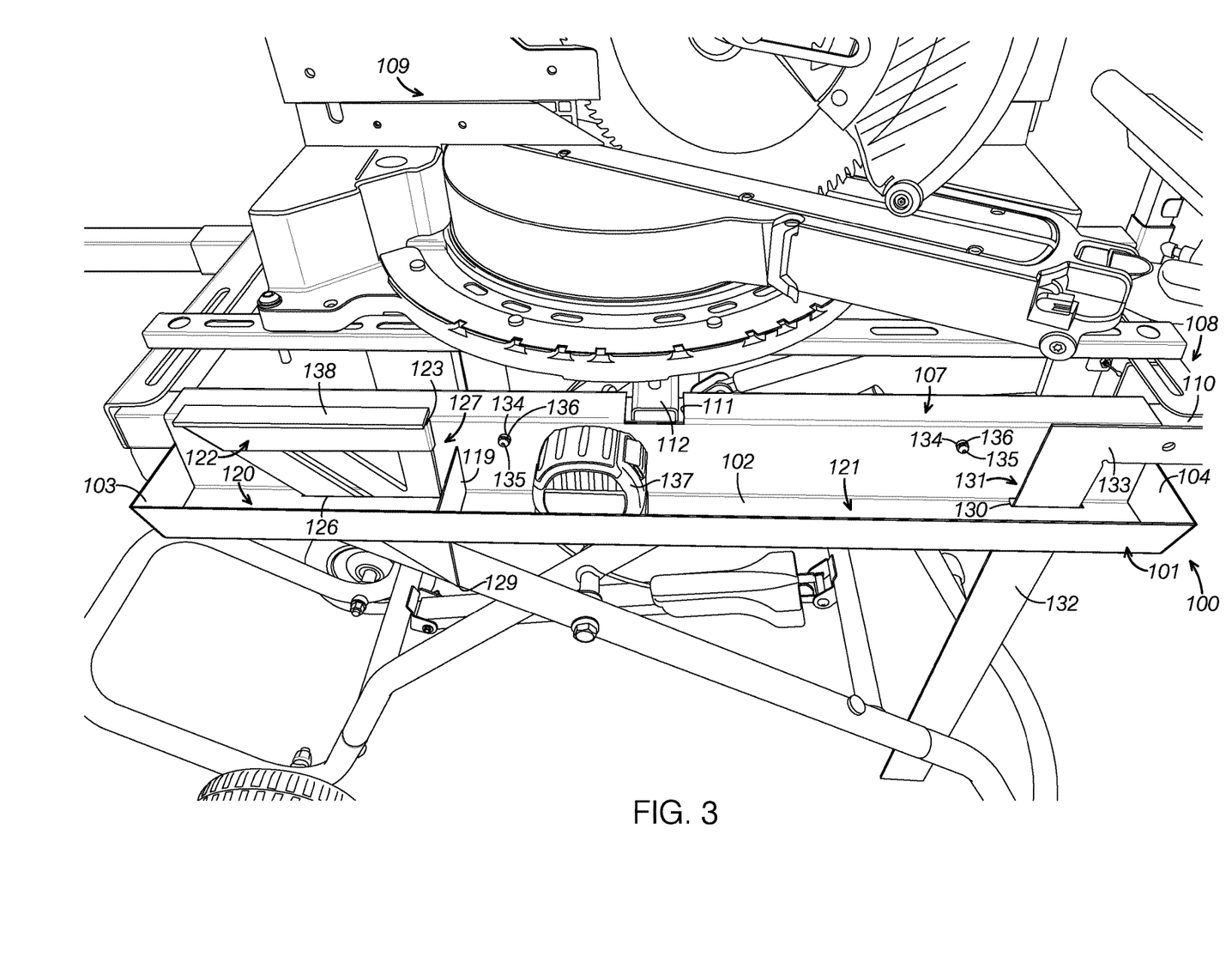
FIG. 3 is a perspective view of the tray shown in FIG. 1 hanging from the rail of the saw frame with tools supported in the tray.
Figure 4:
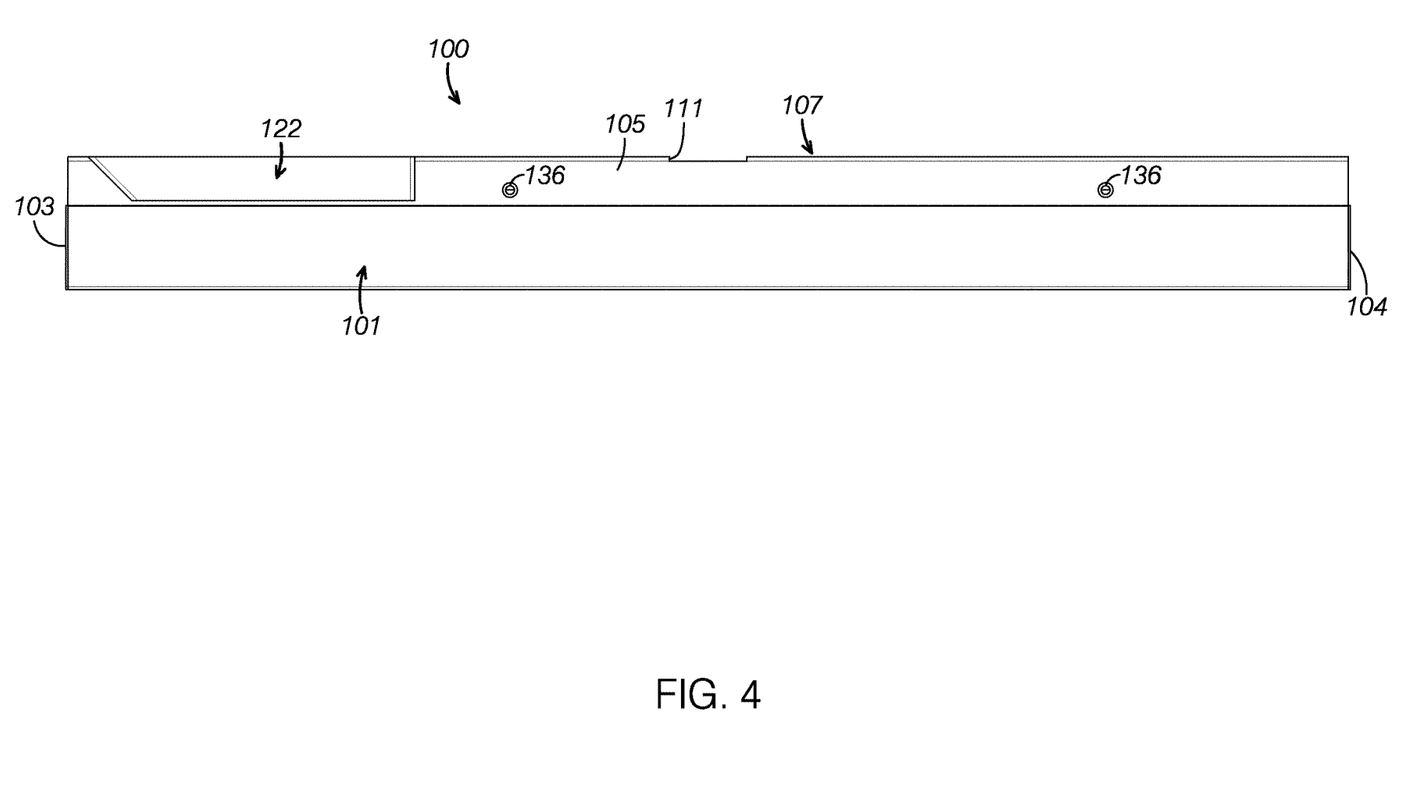
FIG. 4 is a front elevation view of the tray shown in FIG. 1.
Figure 5:
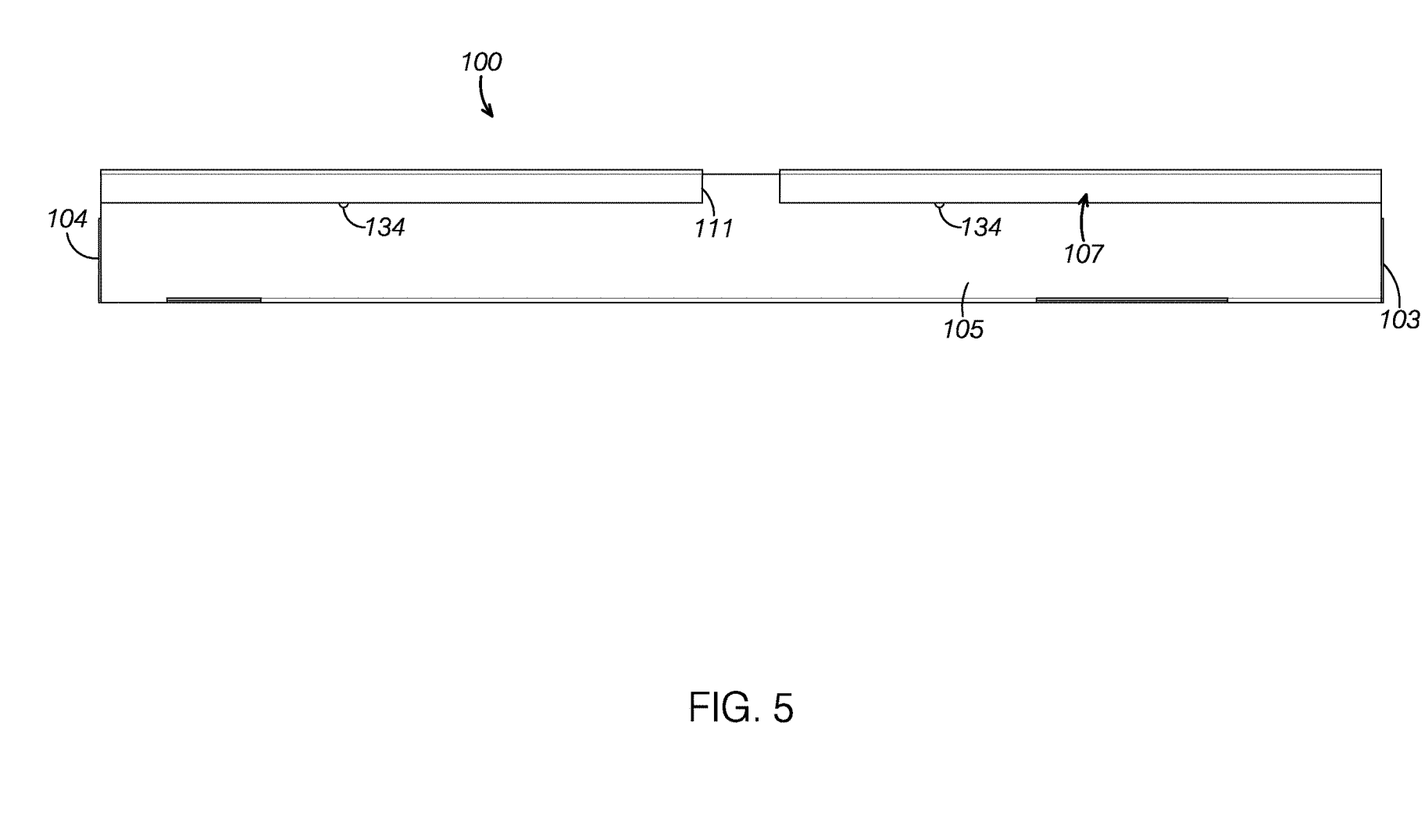
FIG. 5 is a rear elevation view of the tray shown in FIG. 1.

The trays described in this document are often mounted to frames of saws. One example of a saw, saw 109, is depicted in FIGS. 2 and 3.

The saw may be any currently known or later developed type of saw. Various saw types exist and could be used in place of the saw shown in the figures. In addition to the types of saws existing currently, it is contemplated that the trays described herein could be mounted near new types of saws developed in the future.

The size and shape of the saw may be varied as needed for a given application. In some examples, the saw is larger relative to the tray than depicted in the figures. In other examples, the saw is smaller relative to the tray than depicted in the figures. Further, the saw and the tray may each be larger or smaller than described herein while maintaining their relative proportions.

Frame

The trays discussed in this document are configured to mount to a frame of a saw. One example of a frame, frame 108, is depicted in FIGS. 2 and 3. As shown in FIGS. 2 and 3, frame 108 includes a rail 110 on which tray 100 mounts. The reader can further see in FIGS. 2 and 3 that frame 108 includes a support member 112 extending obliquely from rail 110 and that tray 100 includes a gap 111 to accommodate support member 112.

The size and shape of the frame may be varied as needed for a given application. In some examples, the frame is larger relative to the other components than depicted in the figures. In other examples, the frame is smaller relative to the other components than depicted in the figures. Further, the frame and the other components may all be larger or smaller than described herein while maintaining their relative proportions.

The frame may be any currently known or later developed type of frame. Various frame types exist and could be used in place of the frame shown in the figures. In addition to the types of frames existing currently, it is contemplated that the trays described herein could be configured to mount to new types of frames developed in the future.

Tools

The trays described in this document are often used with tools, such as tools that one would utilize with a saw. The figures depict three examples of tools suitable for supporting with the trays described herein. As shown in FIG. 3, a first tool 127 is a speed square. The reader can see in FIG. 3 that a second tool 131 is a carpenter square. With further reference to FIG. 3, a third tool 137 in the form of a tape measure is depicted.

As shown in FIG. 3, first tool 127 includes a tip 129 and a T-edge 138. Tip 129 is disposed on an opposite side of first tool 127 than T-edge 138.

The reader can see in FIG. 3 that second tool 131 includes a first arm 132 and a second arm 133. Second arm 133 extends perpendicular to first arm 132.

The tools may be any currently known or later developed type of tool. Various tool types exist and could be used in place of the tools shown in the figures. Suitable tools include a carpenter's square, a speed square, a tape measure, a ruler, a pencil, tape, sand paper, a file, a hammer, a screwdriver, and others. In addition to the types of tools existing currently, it is contemplated that the trays described herein could incorporate new types of tools developed in the future.

The size and shape of the tools may be varied as needed for a given application. In some examples, the tools are larger relative to the other components than depicted in the figures. In other examples, the tools are smaller relative to the other components than depicted in the figures. Further, the tools and the other components may all be larger or smaller than described herein while maintaining their relative proportions.

The number of tools in the tray may be selected to meet the needs of a given application. The reader should appreciate that the number of tools may be different in other examples than is shown in the figures. For instance, some tray examples may support additional or fewer tools than depicted in the figures.

Tray Embodiment One

With reference to FIGS. 1-9, a tray 100 will now be described as a first example of a tray. As depicted in FIGS. 2 and 3, tray 100 is for supporting tools and is configured to mount to frame 108 of saw 109.

With reference to FIGS. 1-9, tray 100 includes a trough 101, a back member 105, a hanger 107, a sleeve 122, and self-clinching fasteners 136. In other examples, the tray includes fewer components than depicted in the figures. In certain examples, the tray includes additional or alternative components than depicted in the figures.

The size and shape of the tray may be varied as needed for a given application. In some examples, the tray is larger relative to the other components than depicted in the figures. In other examples, the tray is smaller relative to the other components than depicted in the figures. Further, the tray and the other components may all be larger or smaller than described herein while maintaining their relative proportions.

In the present example, the tray is composed of metal. However, the tray may be composed of any currently known or later developed material suitable for tray applications. Suitable materials include metals, polymers, ceramics, wood, and composite materials.

Trough

Trough 101 functions to contain, support, and organize tools. Trough 101 extends longitudinally from a first end 103 to a second end 104. The reader can see that second end 104 is disposed opposite first end 103.

Figure 1:
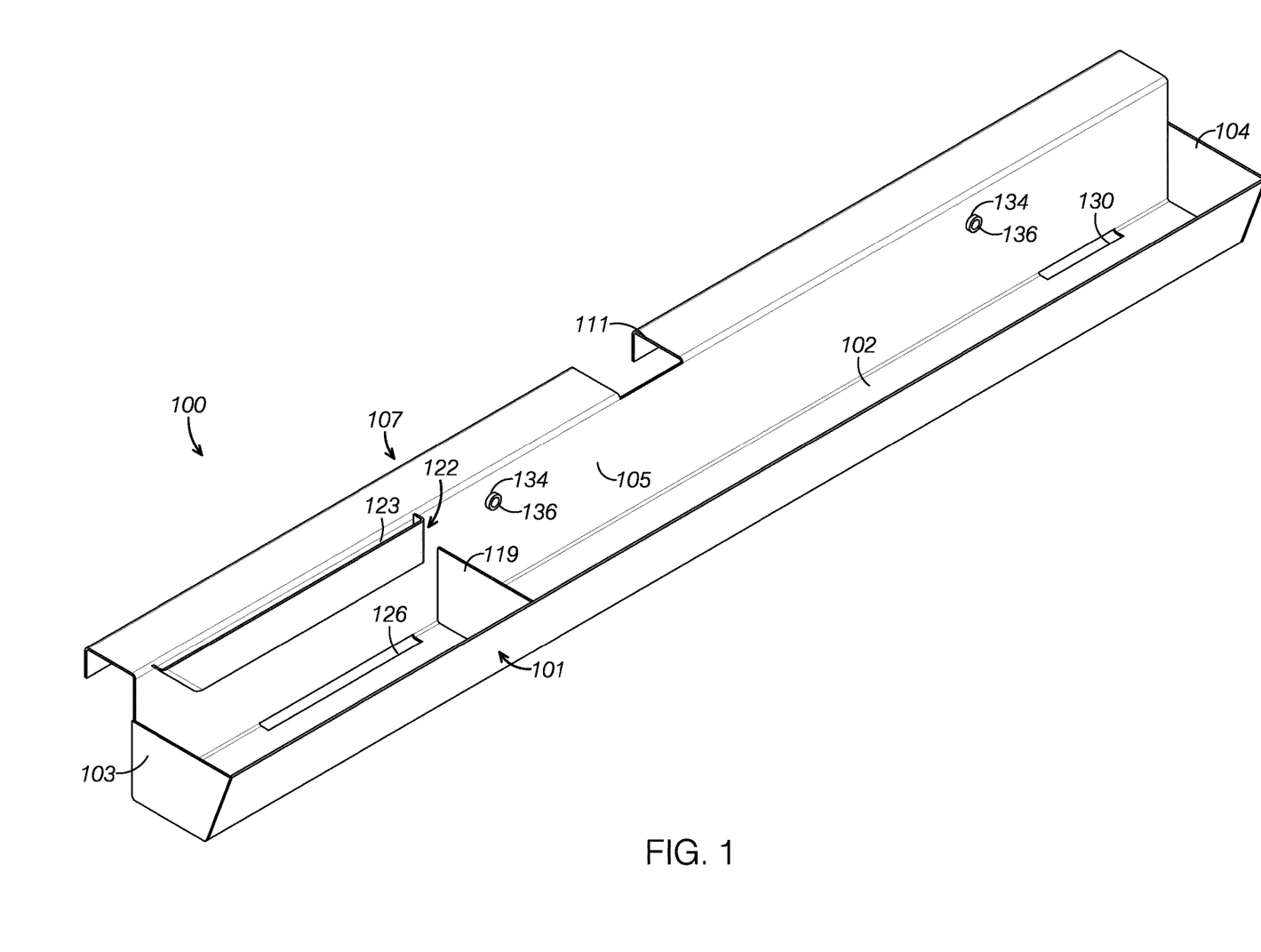
FIG. 1 is a perspective view of a first example of a tray.
Figure 6:
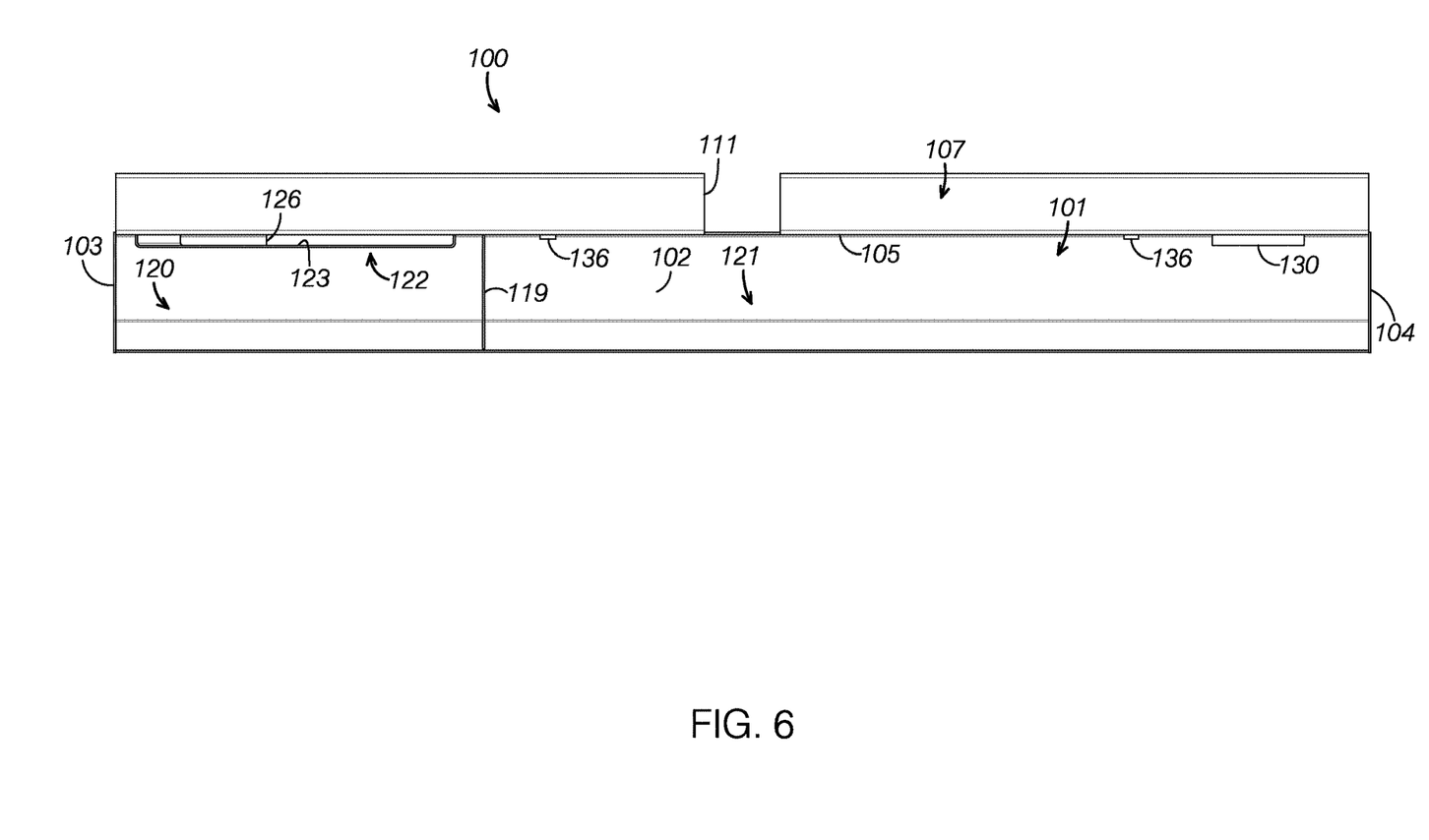
FIG. 6 is a top plan view of the tray shown in FIG. 1.
Figure 7:
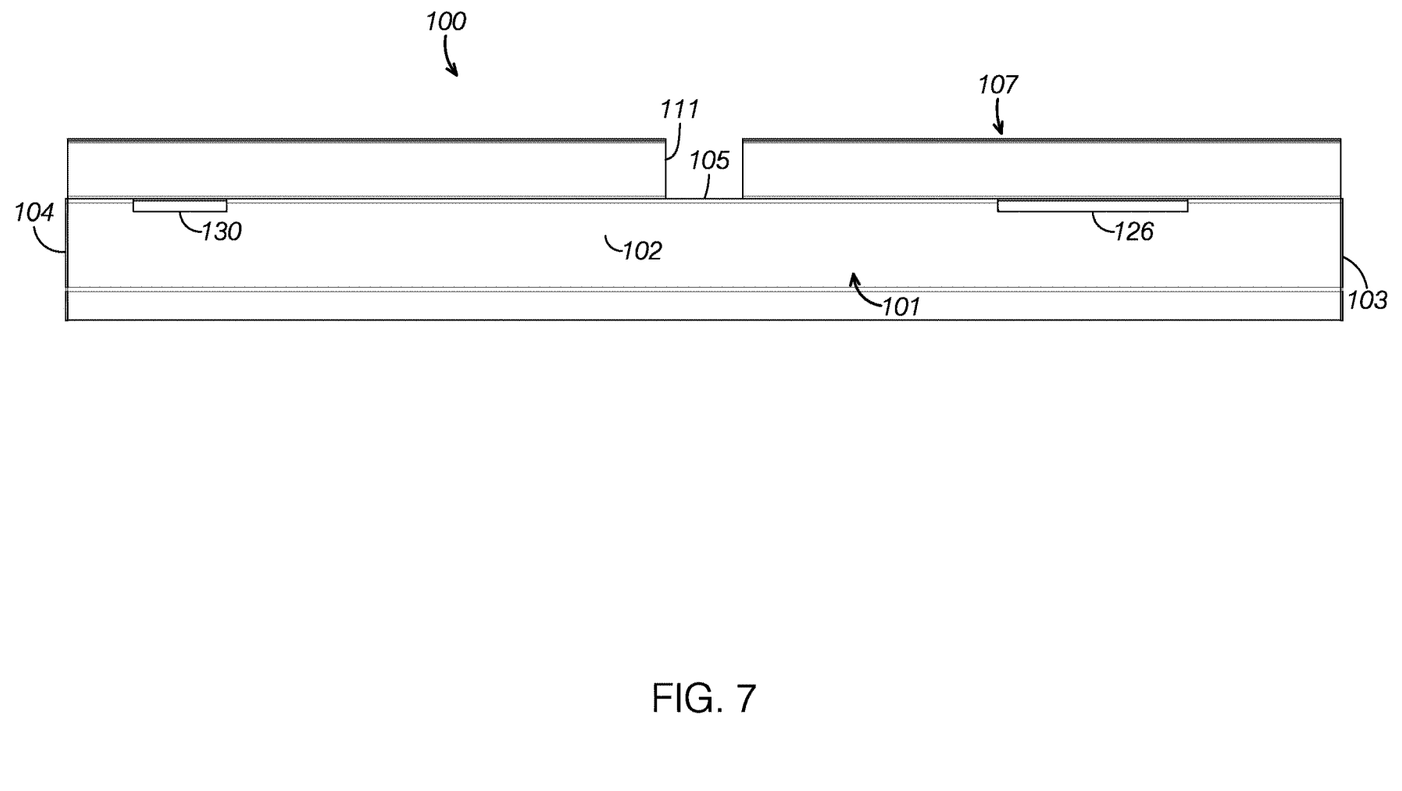
FIG. 7 is a bottom elevation view of the tray shown in FIG. 1.

As shown in FIGS. 1, 3, and 6, trough 101 includes a floor 102 and a divider member 119. Divider member 119 and floor 102 are described further in the sections below.

The reader can see in FIG. 3 that second end 104 is configured to support a second arm 133 of carpenter square 131. In particular, second end 104 of trough 101 supports second arm 133 when carpenter square 131 is disposed in a second slot 130 of floor 102.

The size and shape of the trough may be varied as needed for a given application. In some examples, the trough is larger relative to the other components than depicted in the figures. In other examples, the trough is smaller relative to the other components than depicted in the figures. Further, the trough and the other components may all be larger or smaller than described herein while maintaining their relative proportions.

Floor

The role of floor 102 is to support tools placed in trough 101. In some instances, such as with third tool 137, floor 102 support tools resting on floor 102. In other instances, such as with first tool 127 and second tool 131, floor 102 supports or bounds tools laterally through slots defined in floor 102.

Figure 8:
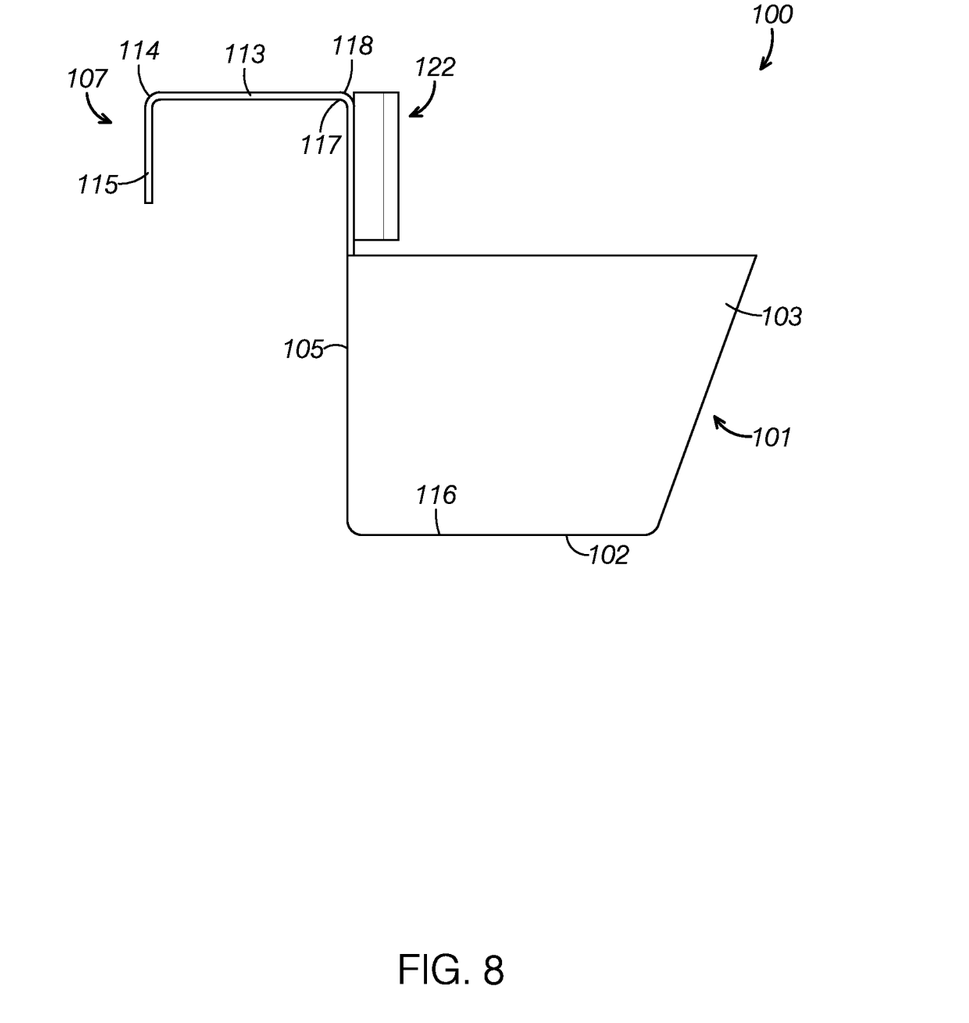
FIG. 8 is a right-side elevation view of the tray shown in FIG. 1.
Figure 9:
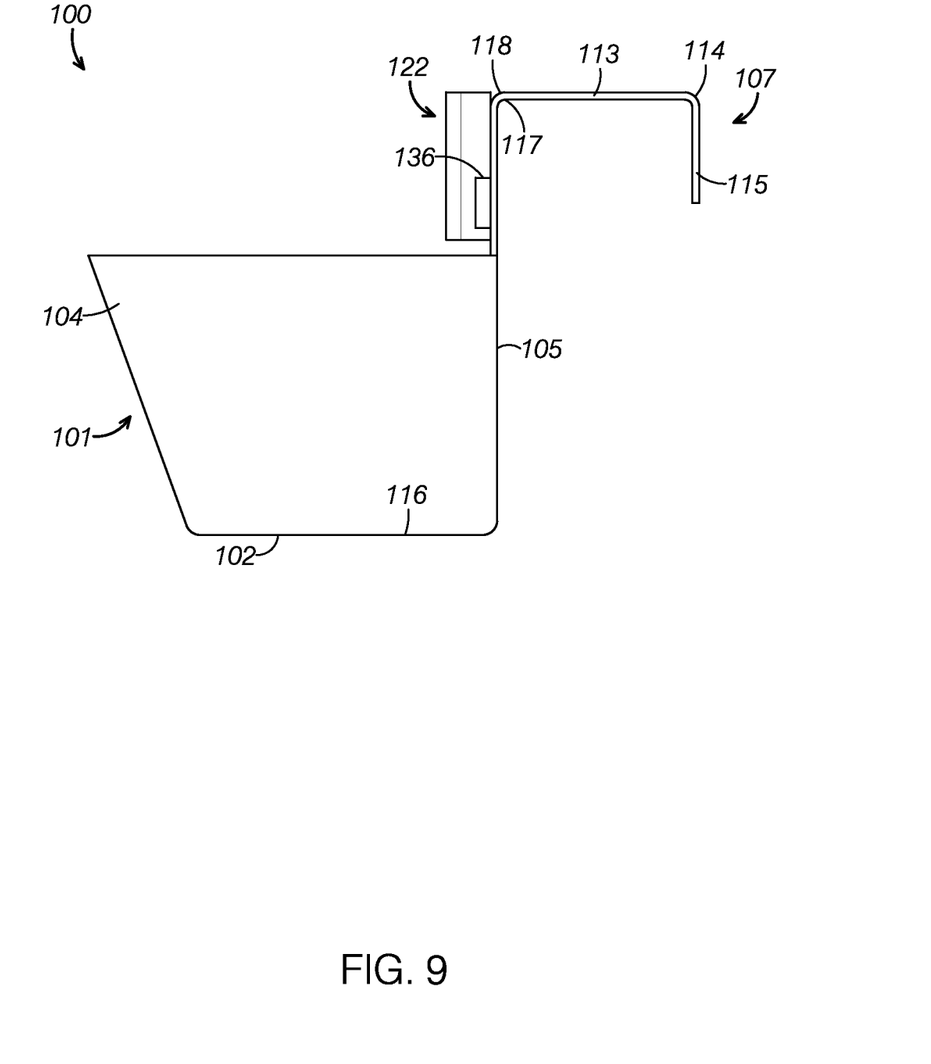
FIG. 9 is a left-side elevation view of the tray shown in FIG. 1.

As depicted in FIGS. 8 and 9, floor 102 defines a floor level 116. Floor 102 and floor level 116 defines a well within trough 101.

With reference to FIGS. 1 and 3, floor 102 defines a first slot 126 and a second slot 130. The slots defined in floor 102 are discussed in more detail in the slots section below.

Slots

The slots function to receive and laterally bound or support tools extending through the slots. As shown in FIGS. 1, 3, and 6, first slot 126 is complementarily configured with first tool 127 and second slot 130 is complementarily configured with second tool 131.

As depicted in FIG. 3, first slot 126 is configured to receive a tip 129 of speed square 127 distal T-edge 138. Thus, first slot 126 allows speed square 127 to extend past floor 102.

As shown in FIGS. 1, 2, 3, and 6, first slot 126 cooperates with sleeve 122 to support first tool 127. Sleeve 122 receives and supports T-edge 138 and first slot 126 receives and supports tip 129. The reader can see in FIGS. 1, 2, 3, and 6 that first slot 126 is aligned with a portion of port 123 of sleeve 122. In particular, first slot 126 is disposed underneath port 123 of sleeve 122.

With reference to FIGS. 1, 3, and 6, second slot 130 is proximate second end 104 of trough 101. As shown in FIG. 3, second slot 130 is configured to receive a first arm 132 of carpenter square 131. Second slot 130 cooperates with second end 104 of trough 101 to support second tool 131. In particular, second slot 130 laterally bounds first arm 132 of carpenter square 131 while second end 104 of trough 101 supports second arm 133 of carpenter square 131.

The number of slots in the tray may be selected to meet the needs of a given application. The reader should appreciate that the number of slots may be different in other examples than is shown in the figures. For instance, some tray examples include additional or fewer slots than described in the present example.

The size and shape of the slots may be varied as needed for a given application. In some examples, the slots are larger relative to the other components than depicted in the figures. In other examples, the slots are smaller relative to the other components than depicted in the figures. Further, the slots and the other components may all be larger or smaller than described herein while maintaining their relative proportions.

Divider Member

As shown in FIGS. 1, 3, and 6, divider member 119 serves to define a first trough portion 120 and a second trough portion 121. First trough portion 120 is disposed on a first longitudinal side of divider member 119. Second trough portion 121 is disposed on a second longitudinal side of divider member 119 opposite the first longitudinal side.

The reader can see in FIGS. 1, 3, and 6 that divider member 119 extends laterally across trough 101. In particular, divider member 119 extends laterally across trough 101 at a position off-center of the length of trough 101. The off-center position of divider member 119 makes the length of first trough portion 120 different than the length of second trough portion 121.

Trough Portions

The size and shape of the trough portions may be varied as needed for a given application. In some examples, the trough portions are larger relative to the other components than depicted in the figures. In other examples, the trough portions are smaller relative to the other components than depicted in the figures. Further, the trough portions and the other components may all be larger or smaller than described herein while maintaining their relative proportions.

Back Member

Back member 105 functions to form a back side of trough 101. Back member 105 further functions to support hanger 107.

As depicted in FIGS. 1, 3, 5, 8, and 9, back member 105 extends transversely from floor 102 and defines a back side of trough 101. With reference to FIGS. 1-3 and 6-9, back member 105 extends longitudinally from first end 103 to second end 104. As shown in FIGS. 8 and 9, back member 105 extends from floor 102 to a top end 117 opposite floor 102. Back member 105 at top end 117 defines a top level 118.

The reader can see in FIGS. 8 and 9 that back member 105 and hanger 107 define a J-shape when viewed from a longitudinal end.

As depicted in FIGS. 1-5, back member 105 defines two fastener ports 134 through back member 105. Fastener ports 134 are described further in the section below.

Fastener Ports

Fastener ports 134 function to provide a path through back member 105 for fasteners to selectively secure tray 100 to rail 110 of frame 108. Fastener ports 134 are complementarily configured with fasteners 135.

The size and shape of the fastener port may be varied as needed for a given application. In some examples, the fastener port is larger relative to the other components than depicted in the figures. In other examples, the fastener port is smaller relative to the other components than depicted in the figures. Further, the fastener port and the other components may all be larger or smaller than described herein while maintaining their relative proportions.

The number of fastener ports in the tray may be selected to meet the needs of a given application. The reader should appreciate that the number of fastener ports may be different in other examples than is shown in the figures. For instance, some tray examples include additional or fewer fastener ports than described in the present example.

Fasteners

Fasteners 135 are configured to secure tray 100 to frame 108. In the present example, fasteners 135 are bolts. However, the fastener may be any currently known or later developed type of fastener. Various fastener types exist and could be used in place of the fastener shown in the figures. In addition to the types of fasteners existing currently, it is contemplated that the trays described herein could incorporate new types of fasteners developed in the future.

In the present example, tray 100 includes two fasteners 135. However, the number of fasteners in the tray may be selected to meet the needs of a given application. The reader should appreciate that the number of fasteners may be different in other examples than is shown in the figures. For instance, some tray examples include additional or fewer fasteners than described in the present example.

Hanger

Hanger 107 functions to couple tray 100 to frame 108. As shown in FIGS. 2 and 3, hanger 107 is complementarily configured with a frame 108 for a saw 109. The reader can see in FIGS. 2 and 3 that hanger 107 is configured to secure to a rail 110 of frame 108.

With reference to FIGS. 1-3 and 6-9, hanger 107 projects from back member 105 away from trough 101. The reader can see in FIGS. 1 and 5-7 that hanger 107 extends from first end 103 to second end 104. The reader can further see in FIGS. 1 and 5-7 that hanger gap 111 is defined between first end 103 and second end 104.

With reference to FIGS. 2 and 3, hanger gap 111 is aligned with support member 112 when banger 107 secures to rail 110. As depicted in FIGS. 2 and 3, hanger gap 111 is complementarily configured with a support member 112 of frame 108 to receive support member 112 within hanger gap 111.

As shown in FIGS. 8 and 9, hanger 107 includes a first hanger member 113 and a second hanger member 115. As shown in FIGS. 8 and 9, first hanger member 113 extends from top end 117. In particular, as depicted in FIGS. 8 and 9, first hanger member 113 extends transverse to back member 105 to a projection end 114. Projection end 114 is distal back member 105.

The reader can see in FIGS. 8 and 9 that second hanger member 115 extends from first hanger member 113 towards floor level 116 and away from top level 118. As shown in FIGS. 8 and 9, second hanger member 115 extends transverse to first hanger member 113 from projection end 114. With reference to FIGS. 8 and 9, second hanger member 115 extends parallel to back member 105.

The size and shape of the hanger may be varied as needed for a given application. In some examples, the hanger is larger relative to the other components than depicted in the figures. In other examples, the hanger is smaller relative to the other components than depicted in the figures. Further, the hanger and the other components may all be larger or smaller than described herein while maintaining their relative proportions.

Sleeve

The role of sleeve 122 is to support a tool within trough 101. As shown in FIGS. 1 and 3, sleeve 122 and first slot 126 are complementarily configured with a first tool 127 to receive and secure first tool 127.

As depicted in FIGS. 1-3 and 6, sleeve 122 is secured to back member 105 on a trough-facing side of back member 105. With reference to FIGS. 1-3 and 6, sleeve 122 includes a port 123. Port 123 is described in more detail in the port section below.

The number of sleeves in the tray may be selected to meet the needs of a given application. The reader should appreciate that the number of sleeves may be different in other examples than is shown in the figures. For instance, some tray examples include additional or fewer sleeves than described in the present example.

The size and shape of the sleeve may be varied as needed for a given application. In some examples, the sleeve is larger relative to the other components than depicted in the figures. In other examples, the sleeve is smaller relative to the other components than depicted in the figures. Further, the sleeve and the other components may all be larger or smaller than described herein while maintaining their relative proportions.

Port

Port 123 functions to allow a portion of first tool 127 to pass through sleeve 122. With reference to FIG. 3, port 123 is configured to support T-edge portion 128 of the speed square 127. As depicted in FIG. 3, port 123 is configured for speed square 127 to pass through port 123 except for T-edge portion 128 of speed square 127.

The reader can see in FIGS. 1-3 and 6 that port 123 includes a first opening and a second opening. The first opening is distal floor 102 and the second opening is proximate floor 102.

Self-Clinching Fasteners

Self-clinching fasteners 136 function to secure fasteners 135 within fastener ports 134. As depicted in FIGS. 1-4, self-clinching fasteners 136 are disposed within fastener ports 134.

The self-clinching fasteners may be any currently known or later developed type of self-clinching fastener. The size, shape, and number of the self-clinching fasteners may be selected to suit the needs of a given application and to complement the fasteners and fastener ports utilized by the tray.

Additional Embodiment

Figure 10:
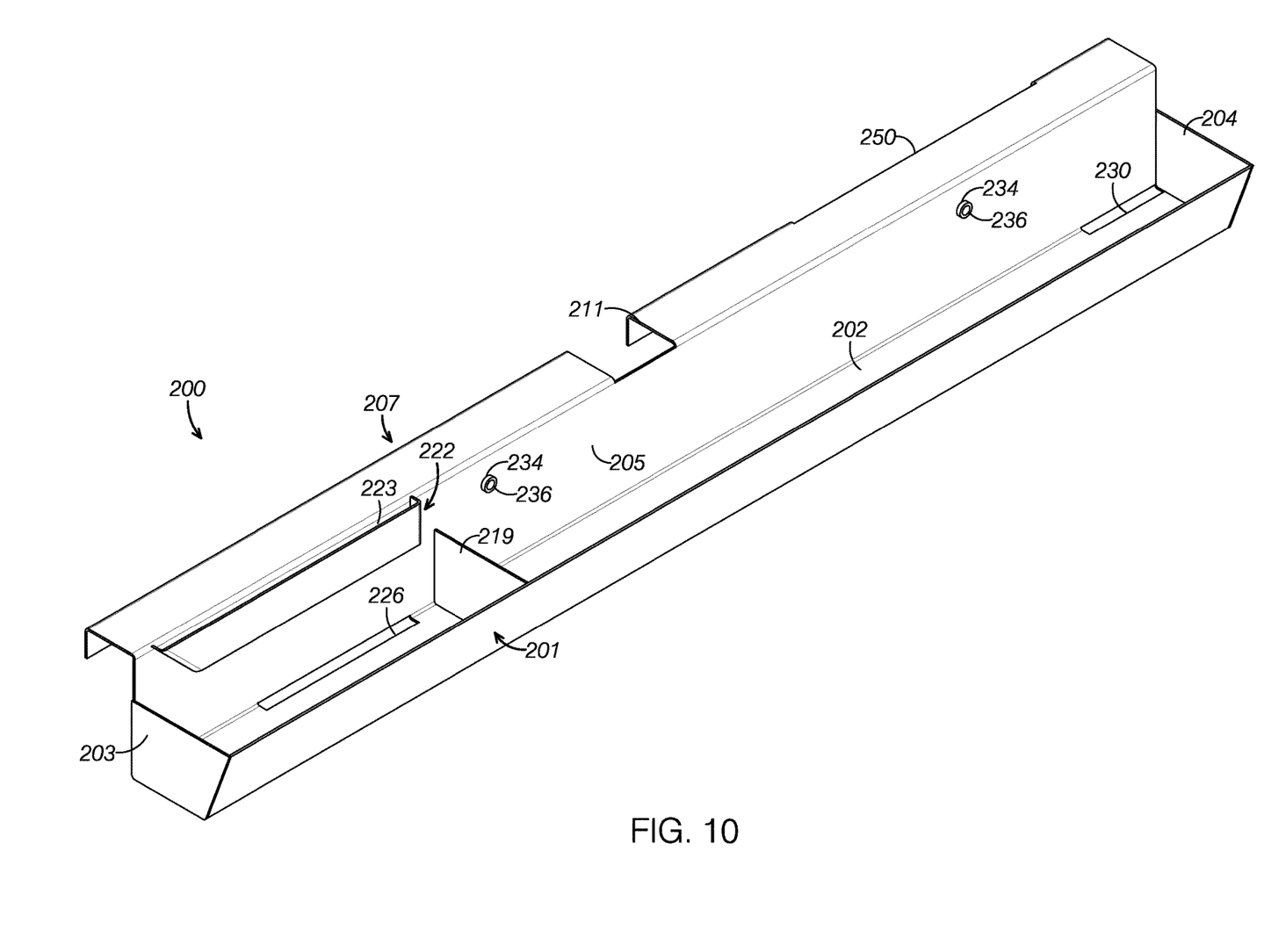
FIG. 10 is a perspective view of a second example of a tray.

With reference to FIG. 10, the discussion will now focus on an additional tray embodiment. The additional embodiment includes many similar or identical features to tray 100. Thus, for the sake of brevity, each feature of the additional embodiment below will not be redundantly explained. Rather, key distinctions between the additional embodiment and tray 100 will be described in detail and the reader should reference the discussion above for features substantially similar between the different tray examples.

Second Embodiment

Turning attention to FIG. 10, a second example of a tray, tray 200, will now be described. As can be seen in FIG. 10, tray 200 includes a trough 201, a back member 205, a hanger 207, a sleeve 222, and self-clinching fasteners 236. Additional features of tray 200 depicted in FIG. 10 include first end 203, second end 204, first slot 226, port 223, divider 219, fastener ports 234, hanger gap 211, floor 202, second slot 230, and a cutout 250.

A distinction between tray 200 and tray 100 is that hanger 207 defines cutout 250. Cutout 250 may accommodate mounting to saw frames with different configurations similar to how hanger gap 211 accommodates support members of saw frames.

Another distinction between tray 200 and tray 100 is that second slot 230 is disposed closer to second end 204 of trough 201 than second slot 130. Second slot 230 being defined closer to second end 204 may assist with supporting a tool in cooperation with second end 204 with more stability.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A tool tray for selectively mounting to a frame of a saw, comprising:
    a trough configured to receive tools, the trough including a floor and extending longitudinally from a first end to a second end opposite the first end;
    a back member extending transversely from the floor and defining a back side of the trough;
    a hanger projecting from the back member away from the trough, the hanger including a first hanger portion and a second hanger portion spaced from the first hanger portion and defining a hanger gap in the space between the first hanger portion and the second hanger portion; and
    a sleeve secured to the back member on a trough-facing side of the back member
    wherein:
        the hanger is configured to secure to a rail of a frame for a saw;
        the trough includes continuous sidewalls extending from the floor and cooperating with the back member to contain tools placed within the trough;
        the continuous sidewalls and the back member cooperate to define an opening opposite the floor to enable placing tools within the trough;
        the back member extends from the first end to the second end;
        the hanger gap is configured to receive a support member of the frame within the hanger gap;
    the sleeve includes a port having:
        a first opening distal the floor; and
        a second opening proximate the floor; and
    the floor defines a first slot aligned with a portion of the port.

2. The tool tray of claim 1, wherein the hanger includes:
    a first hanger member extending transverse to the back member to a projection end distal the back member; and
    a second hanger member extending transverse to the first hanger member from the projection end.

3. The tool tray of claim 2, wherein the second hanger member extends parallel to the back member.

4. The tool tray of claim 3, wherein:
    the floor defines a floor level;
    the back member extends from the floor to a top end opposite the floor and defining a top level; and
    the first hanger member extends from the top end.

5. The tool tray of claim 4, wherein the second hanger member extends from the first hanger member towards the floor level and away from the top level.

6. The tool tray of claim 5, wherein the back member and the hanger define a J-shape when viewed from a longitudinal end.

7. The tool tray of claim 1, wherein the trough includes a divider member extending laterally across the trough to define a first trough portion on a first longitudinal side of the divider member and a second trough portion on a second longitudinal side of the divider member opposite the first longitudinal side.

8. The tool tray of claim 7, wherein the divider member extends laterally across the trough at a position off-center of a length of the trough to make a length of the first trough portion different than a length of the second trough portion.

9. The tool tray of claim 1, wherein the sleeve and the first slot are configured to receive and secure the first tool.

10. The tool tray of claim 9, wherein:
the first tool is a speed square;
the port is configured for the speed square to pass through the port except for a T-edge portion of the speed square;
the port is configured to support the T-edge portion of the speed square; and
the first slot is configured to receive a tip of the speed square distal the T-edge to allow the speed square to extend past the floor.

11. The tool tray of claim 1, wherein the back member defines a fastener port through the back member complementarily configured with a fastener configured to secure the tray to the frame.

12. The tool tray of claim 11, further comprising a self-clinching fastener disposed within the fastener port.

13. A tool tray for selectively mounting to a frame of a saw, comprising:
a trough configured to receive tools, the trough including a floor and extending longitudinally from a first end to a second end opposite the first end;
a back member extending transversely from the floor and defining a back side of the trough; and
a hanger projecting from the back member away from the trough, the hanger including a first hanger portion and a second hanger portion spaced from the first hanger portion and defining a hanger gap in the space between the first hanger portion and the second hanger portion;
wherein:
the hanger is configured to secure to a rail of a frame for a saw;
the trough includes continuous sidewalls extending from the floor and cooperating with the back member to contain tools placed within the trough;
the continuous sidewalls and the back member cooperate to define an opening opposite the floor to enable placing tools within the trough;
the back member extends from the first end to the second end;
the hanger gap is configured to receive a support member of the frame within the hanger gap;
the floor defines a second slot configured to receive a second tool;
the second slot is proximate a longitudinal end of the trough;
the second tool is a carpenter square;
the second slot is configured to receive a first arm of the carpenter square; and
the longitudinal end of the trough is configured to support a second arm of the carpenter square extending perpendicular to the first arm.

* * * * *